May 24, 1938.  J. H. BOOTH  2,118,149
HINGE
Filed Nov. 8, 1934
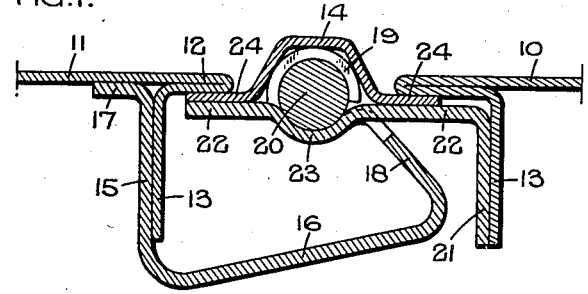
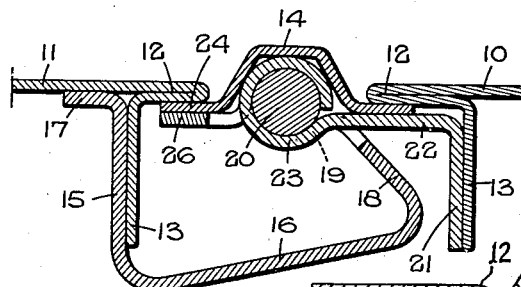
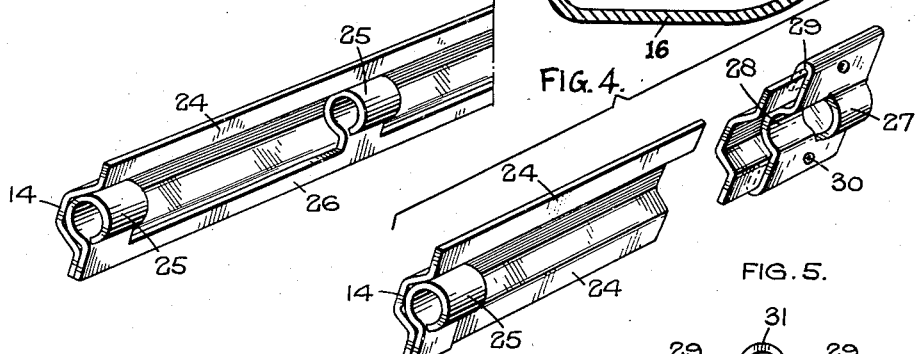
John Holt Booth
INVENTOR
By Otto Munk
his ATT'Y.

Patented May 24, 1938

2,118,149

UNITED STATES PATENT OFFICE 2,118,149

HINGE

John Holt Booth, Four Oaks, Sutton Coldfield, England, assignor of one-third to Arthur Sam Cheston and one-third to Herbert Linwood Sleigh, Birmingham, England Application November 8, 1934, Serial No. 751,973
In Great Britain November 18, 1933

13 Claims. (Cl. 16—128.1)

This invention relates to long hinges of the kind used in certain sheet metal structures, for example, the hinges employed for the plates of bonnet coverings for the engine of a motor vehicle, or the hinges for attaching the covers of dickey seats to vehicles or for attaching the hinged lids of luggage containers.

Hinges of this kind are commonly applied to plates having a painted or enamelled finished surface, and such surface commonly becomes scratched or damaged after a period of use due to abrasion between contacting metal parts when one of the plates is moved or opened, and the present invention provides a construction in which scratching or damage to such enamelled or painted surface is reduced or eliminated.

Referring to the drawing:—

Figure 1 is a sectional end elevation of a bonnet hinge of an automobile vehicle and constructed in accordance with the present invention.

Figure 2 is a sectional elevation of a modification.

Figure 3 is a perspective view showing the cover plate of the construction illustrated in Figure 2.

Figure 4 is a similar view of a slight modification.

Figure 5 illustrates a clip for attaching the cover plate to the hinge pin.

Figures 6 and 7 illustrate in section further slight modifications.

In the construction illustrated in Figures 1 and 2, the hinge adapted for connecting the bonnet plates for the engine of a motor vehicle comprises primary and secondary plates 10 and 11 respectively, each of which is turned upon itself at the edge to be hinged to form an edge 12 of double thickness, the overturned portion being bent downwardly at 13 substantially at right angles to the plane of the main portion of the plate.

The cover plate 14 is formed separately of both primary and secondary plates and can thus be formed from material different from that of which these plates are constructed, or may be finished or plated in a different manner.

One side 15 of a channel 16 is secured to the downwardly projecting portion 13 of the secondary plate 11 and a lateral flange 17 on this channel is secured to the underside of the secondary plate.

The other side 18 of the channel 16 is slotted to form a plurality of spaced tongues which are subsequently bent into loop-like form 19 for engagement with the hinge pin 20.

To the portion 13 of the primary plate are attached brackets of angle section, one arm 21 of each bracket being secured to the portion 13 and the other arm 22 extending parallel to the primary plate 10 and having an arcuate portion 23 for engaging under the pin 20.

The cover plate 14 is formed with a wing 24 at each longitudinal edge, and is secured by welding to the portions 22 of the brackets, such that the loops or knuckles 19 on the channel 16 space the cover plate from the hinge pin 20 whilst the portions 23 of the brackets lie between the spaced loops 19 on the channel 16.

In this construction the cover plate 14 can be formed from stainless steel or can be chromium or nickel-plated, whilst the primary and secondary plates 10 and 11 are formed from sheet metal with a painted finish. Alternatively the construction allows the cover plate to be painted in a different color from that of the plates 10 and 11.

In this construction the cover plate is spot welded at each wing 24 to the arms 22 of the attachment brackets, but the welding marks are hidden by the overlapping edges of the plates 10 and 11.

In the construction illustrated in Figures 2 and 3 the cover plate is constructed as described with reference to Figure 1 but is mounted on the hinge pin 20 by means of loops 25 formed on a strip 26 welded to one wing 24 of the cover plate.

The primary plate 10 is mounted on the pin by means of brackets as described with reference to Figure 1, but the portions 23 are extended around the pin to form complete loops.

In this construction one wing 24 of the cover plate is welded to the strip 26 and the other wing is retained between the doubled edge 12 of the primary plate 10 and the upper surface of the arm 22 of the attachment brackets.

In the slight modification illustrated in Figure 4, only a single loop 25 is provided at one end of the cover plate, and at the opposite end a detachable clip is provided for retaining the cover plate upon the hinge pin.

This detachable clip is formed from a strip of metal formed at its centre with two arcuate portions 27 and 28 extending in opposite directions, the portion 27 engaging beneath the hinge pin and the other portion 28 engaging above the pin.

In this construction the cover plate can be inserted in position after the hinge has been assembled, since the wing 24 can be slid longitudinally of the hinge between the edge 12 and the arm 22 of the attachment brackets, and when the loop 25 is engaging one end of the hinge pin, the detachable clip is inserted on the other end of the cover plate and over the opposite end of the hinge pin.

Each edge of the clip is doubled at 29 to form a channel into which the wing of the cover plate can be slid, and when the clip is in position it is retained either by spot welding or by centre punching as at 30.

In Figure 5 is shown a slightly modified clip bent to form a complete loop 31 for engagement with the pin with doubled edges 29 to provide the channels for the wings 24 of the cover plate.

In the modification illustrated in Figure 6, the hinge is constructed as described with reference to Figure 2, but the cover plate is detachable from the remaining part of the hinge without removing the hinge pin. In this construction the one wing 24 engages in overlapping relationship with the edge 12 of the secondary plate 11, and the other wing is engaged between the edge 12 of the primary plate 10 and the upper surface of the arm 22 of the brackets attached to the plate 10.

The hinge can be assembled and finished and the cover plate 14 can be plated or painted to the desired finish and can be subsequently slipped in position. The cover plate in addition is readily detachable from the hinge without removing the pin or disconnecting the pivotal engagement between the primary and secondary plates 10 and 11.

In the further modification illustrated in Figure 7, the hinge is similar to that described with reference to Figure 1 but the cover plate is not welded or otherwise permanently attached and can be mounted upon the hinge after the latter has been assembled, and if desired can be detached without effecting the pivotal engagement between the primary and secondary plates 10 and 11.

One wing of the cover plate is turned under at 32 to engage the projecting edges 33 of the portions 23, and the other wing of the cover plate is slipped beneath the edge 12 of the primary plate 10 as described with reference to Figure 6.

The cover plate can again be slid in position after the hinge has been assembled by engaging one wing beneath the edge 12 of the primary plate 10 and engaging the overturned edge 32 beneath the edge 33, the cover plate being then slid axially of the hinge into position.

In all the constructions described above the cover plate or portion is of inverted channel shape and the sides of the channel are supported from the hinge pin so that the cover plate is strengthened and stiffened against distortion or bending in use.

The cover plate seats upon the knuckles engaging the hinge pin and is supported along its length and along a plurality of lines which are spaced angularly around the peripheries of the loops so that distortion of the cover plate due to localized support is eliminated.

In addition the cover plate is supported across its width without causing excessive frictional contact between the cover plate and the loops of the hinge plates so that the latter can be moved around the pin without considerable friction between the loops and the cover plate although the sides of the cover plate are supported and reinforced.

The support of the cover plate along a plurality of spaced lines disposed angularly around the periphery of the hinge pin prevents the cover plate moving laterally with respect to the hinge pin in a downward direction, and in the constructions in which the cover plate has portions engaging beneath the hinge pin, movement of the cover plate laterally in an upward direction is also prevented.

In all the constructions sufficient clearance is provided between the cover plate and portions of the hinge adapted to move around the cover plate so that scratching or damage of the exposed surface of the hinge, and particularly the upper surface of the cover plate, is prevented.

If there is any frictional or rubbing contact between the cover plate and any parts of the hinge which are moved with respect to the cover plate when the hinge is in use, the painted or polished finish of the cover plate becomes damaged and the appearance of the hinge is impaired.

With the construction according to the present invention the appearance of the hinge is maintained after considerable periods of use, and in the constructions in which the cover plate is detachable from the hinge without effecting the hinge connection between the two hinge plates, the cover plate can be detached and replaced or re-finished.

The invention has been described as applied to the plates of bonnet coverings for the engine of a motor vehicle, but it will be appreciated that it may also be applied to the hinges for attaching the covers of dickey seats to vehicles, or for attaching the hinged lids of luggage containers, or for any other application in which it is desired to provide a long substantially continuous hinge or where weather protection is needed to prevent water or the like passing between the joints in the hinge.

What I claim then is:—

1. A hinge including a hinge pin, primary and secondary hinge plates, parts on each of said plates engaging said pin, a continuous cover plate formed separately of the primary and secondary hinge plates and extending along said pin in spaced relationship therewith, said cover plate being of inverted non-circular channel section, and the sides of the channel being supported from the hinge pin along the length of the cover plate, to provide reinforcement for said cover plate across its width.

2. A hinge including a hinge pin, a primary hinge plate, parts on said plate engaging said pin, a secondary hinge plate, parts on said plate engaging said pin, a continuous cover plate formed separately of the primary and secondary hinge plates and extending along said pin in spaced relationship therewith, said cover plate comprising an inverted channel with a substantially flat top and substantially flat sides, and the sides of the channel being supported from the hinge pin along the length of the cover plate, to provide reinforcement for said cover plate across its width.

3. A hinge including a hinge pin, a primary hinge plate, loops on said plate engaging said pin, a secondary hinge plate, loops on said plate engaging said pin, the loops on one plate engaging said pin between the loops on the other plate, a continuous cover plate formed separately of the primary and secondary hinge plates and extending along said pin in spaced relationship therewith, and covering the joints between said loops, said cover plate comprising an inverted channel with a substantially flat top and substantially flat sides, and the sides of said channel being supported on said loops along the length of the cover plate to provide reinforcement for said cover plate across its width.

4. A hinge including a hinge pin, a primary hinge plate, loops engaging said hinge pin, attachment portions on said loops, means for securing said attachment portions to said plate, a secondary hinge plate, further loops engaging said pin, attachment portions on said loops, means for securing said attachment portions to said secondary hinge plate, a continuous cover plate formed separately of the primary and secondary hinge plates and extending along said pin in spaced relationship therewith, and covering the joints between said loops, said cover plate comprising an inverted channel with a substantially flat top and substantially flat sides, and the sides of the channel being supported from the hinge pin along the length of the cover plate to provide reinforcement for said cover plate across its width.

5. A hinge including a hinge pin, a primary hinge plate, parts on said plate engaging said pin, a secondary hinge plate, parts on said plate engaging said pin, a continuous cover plate extending along said pin in spaced relationship therewith, said cover plate being of inverted channel section, the sides of the channel being supported from the hinge pin along the length of the cover plate to provide reinforcement for said cover plate across its width, and a laterally projecting wing at each side of said cover plate, each wing extending longitudinally of said cover plate, one wing being secured to one of said hinge plates and the other wing being adapted to abut in overlapping relationship with the inner face of the other hinge plate to form a joint therewith when in the closed position.

6. A hinge including a hinge pin, a primary hinge plate, loops on said plate engaging said pin, a secondary hinge plate, loops on said plate engaging said pin, a continuous cover plate extending along said pin in spaced relationship therewith and covering the joints between said loops, said cover plate comprising an inverted channel with a substantially flat top and substantially flat sides, and a laterally projecting wing integral with the longitudinal edge of each side of said cover plate, each wing extending longitudinally of said cover plate, one wing being secured to one of said hinge plates and the other wing being adapted to abut in overlapping relationship with the inner face of the other hinge plate to form a joint therewith when in the closed position.

7. A hinge including a hinge pin, a primary hinge plate, loops on said plate engaging said pin, a secondary hinge plate, loops on said plate engaging said pin, a continuous cover plate extending along said pin in spaced relationship therewith, said cover plate comprising an inverted channel with a substantially flat top and substantially flat sides, a laterally projecting wing integral with the longitudinal edge of each side of said cover plate, each wing extending longitudinally of said cover plate, one wing being secured to one of said hinge plates and the other wing being adapted to abut in overlapping relationship with the inner face of the other hinge plate to form a joint therewith when in the closed position, and parts on said cover plate engaging said pin to locate the cover plate with respect thereto.

8. A hinge including a hinge pin, a primary hinge plate, parts on said plate engaging said pin, a secondary hinge plate, parts on said plate engaging said pin, a continuous cover plate extending along said pin in spaced relationship therewith, a laterally projecting wing at each side of said cover plate, each wing extending longitudinally of said cover plate, one wing being secured to one of said hinge plates and the other wing being adapted to abut in overlapping relationship with the inner face of the other hinge plate to form a joint therewith when in the closed position, a retaining loop at each end of said cover plate, said retaining loops engaging said pin to locate the cover plate thereon, and one of said loops being secured in a detachable manner to allow said cover plate to be slid from said pin.

9. A hinge including a hinge pin, a primary hinge plate, loops on said plate engaging said pin, a secondary hinge plate, loops on said plate engaging said pin, a continuous cover plate extending along said pin in spaced relationship therewith, said cover plate comprising an inverted channel with a substantially flat top and substantially flat sides, a laterally projecting wing integral with the longitudinal edge of each side of said cover plate, each wing extending longitudinally of said cover plate, one wing being secured to one of said hinge plates and the other wing being adapted to abut in overlapping relationship with the inner face of the other hinge plate to form a joint therewith when in the closed position, retaining loops for said cover plate, an attachment strip for said loops, said attachment strip being fixed to one wing of said cover plate and said retaining loops engaging said pin along the length thereof to locate the cover plate thereon.

10. A hinge including a hinge pin, a primary hinge plate, parts engaging said pin, attachment portions on said parts, means for securing said attachment portions to said plate, a folded portion adjacent the edge of said plate, a continuous cover plate extending along said pin in spaced relationship therewith, said cover plate being of inverted channel section, a laterally projecting wing at each side of said cover plate, each wing extending longitudinally of said cover plate, one of said wings being detachably engaged between said folded portion and the attachment portions, a secondary hinge plate, further parts engaging said pin, attachment portions on said parts, means for securing said attachment portions to said secondary hinge plate, and the other wing of said cover plate being adapted to abut in overlapping relationship with the inner face of said secondary hinge plate to form a joint therewith in the closed position.

11. A hinge including a hinge pin, a primary hinge plate, arcuate parts engaging said pin, attachment portions on said arcuate parts, means for securing said attachment portions to said plate, a folded portion adjacent the edge of said plate, a continuous cover plate extending along said pin in spaced relationship therewith, said cover plate comprising an inverted channel with a substantially flat top and substantially flat sides, a laterally projecting wing integral with the longitudinal edge of each side of said cover plate, each wing extending longitudinally of said cover plate, one of said wings being engaged between said folded portion and the attachment portions, retaining portions on said cover plate, said portions engaging said pin to locate the cover plate with respect thereto, a secondary hinge plate, further arcuate parts engaging said pin, attachment portions on said arcuate parts, means for securing said attachment portions to said secondary hinge plate, and the other wing of said cover plate being adapted to abut in overlapping relationship with the inner face of said secondary hinge plate to form a joint therewith in the closed position.

12. A hinge including a hinge pin, a primary hinge plate, a strip secured to said plate, parts on said strip engaging said pin, a folded portion adjacent the edge of said plate, a continuous cover plate extending along said pin in spaced relationship therewith, said cover plate being of inverted channel section, a laterally projecting wing at each side of said cover plate, each wing extending longitudinally of said cover plate, one of said wings being engaged between said folded portion and said strip, retaining portions on said cover plate, said portions engaging said pin to locate the cover plate with respect thereto, a secondary hinge plate, parts on said secondary hinge plate engaging said pin, and the other wing of said cover plate being adapted to abut in overlapping relationship with the inner face of said secondary hinge plate to form a joint therewith in the closed position.

13. A hinge including a hinge pin, a primary hinge plate, a continuous cover plate formed separately of said hinge plate and extending along said pin in spaced relationship therewith, said cover plate being of inverted channel section, the sides of the channel being supported from the hinge pin along the length of the cover plate to provide reinforcement for said cover plate across its width, an attachment portion along one side of said cover plate, means for securing said attachment portion to said primary plate, parts at the other side of said cover plate engaging said pin, and a secondary hinge plate, parts on said secondary hinge plate engaging said pin.

JOHN HOLT BOOTH.